United States Patent
Yasumoto et al.

(10) Patent No.: US 9,469,116 B2
(45) Date of Patent: Oct. 18, 2016

(54) PRINTER

(71) Applicant: FUNAI ELECTRIC CO., LTD., Osaka (JP)

(72) Inventors: Atsushi Yasumoto, Itami (JP); Yoshihiko Imura, Kishiwada (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 14/689,356

(22) Filed: Apr. 17, 2015

(65) Prior Publication Data

US 2015/0298459 A1 Oct. 22, 2015

(30) Foreign Application Priority Data

Apr. 18, 2014 (JP) ................. 2014-086796

(51) Int. Cl.
*B41J 2/175* (2006.01)

(52) U.S. Cl.
CPC ........... *B41J 2/1752* (2013.01); *B41J 2/17503* (2013.01)

(58) Field of Classification Search
None
See application file for complete search history.

(56) References Cited

U.S. PATENT DOCUMENTS

| | | | |
|---|---|---|---|
| 4,990,938 A | 2/1991 | Brandon et al. | |
| 6,648,456 B1* | 11/2003 | Asano | B41J 2/1752 347/49 |
| 7,883,173 B1 | 2/2011 | Tratar et al. | |
| 8,297,738 B1 | 10/2012 | Kodama et al. | |
| 2003/0169318 A1 | 9/2003 | Kline et al. | |
| 2004/0183856 A1* | 9/2004 | Yang | B41J 25/34 347/49 |
| 2005/0168545 A1* | 8/2005 | Sakai | B41J 2/17513 347/86 |
| 2006/0164482 A1* | 7/2006 | Katayama et al. | 347/86 |
| 2007/0229625 A1* | 10/2007 | Yano | B41J 2/17509 347/86 |
| 2008/0038037 A1 | 2/2008 | DeVore et al. | |
| 2009/0167828 A1* | 7/2009 | Ito | B41J 2/17513 347/86 |
| 2009/0256884 A1* | 10/2009 | Aoki | B41J 2/1721 347/23 |

FOREIGN PATENT DOCUMENTS

| | | |
|---|---|---|
| EP | 1 348 562 | 10/2003 |
| EP | 1 800 872 | 6/2007 |
| JP | 2005-81712 | 3/2005 |
| JP | 2008-203679 | 9/2008 |
| JP | 2013-212602 | 10/2013 |

OTHER PUBLICATIONS

Partial European Search Report issued Sep. 17, 2015 in corresponding European Application No. 15163946.5.

* cited by examiner

*Primary Examiner* — Justin Seo
(74) *Attorney, Agent, or Firm* — Wenderoth, Lind & Ponack, L.L.P.

(57) ABSTRACT

A printer comprising a carriage including: a first lid that holds an ink cartridge; a first axis of rotation located at a first end portion of the first lid; and an opening portion located at a second end portion of the first lid opposite the first end portion, wherein the first lid is rotatable between a first positional state and a second positional state about the first axis of rotation, and a location of the opening portion when the first lid is in the first positional state is higher than a location of the opening portion when the first lid is in the second positional state.

14 Claims, 8 Drawing Sheets

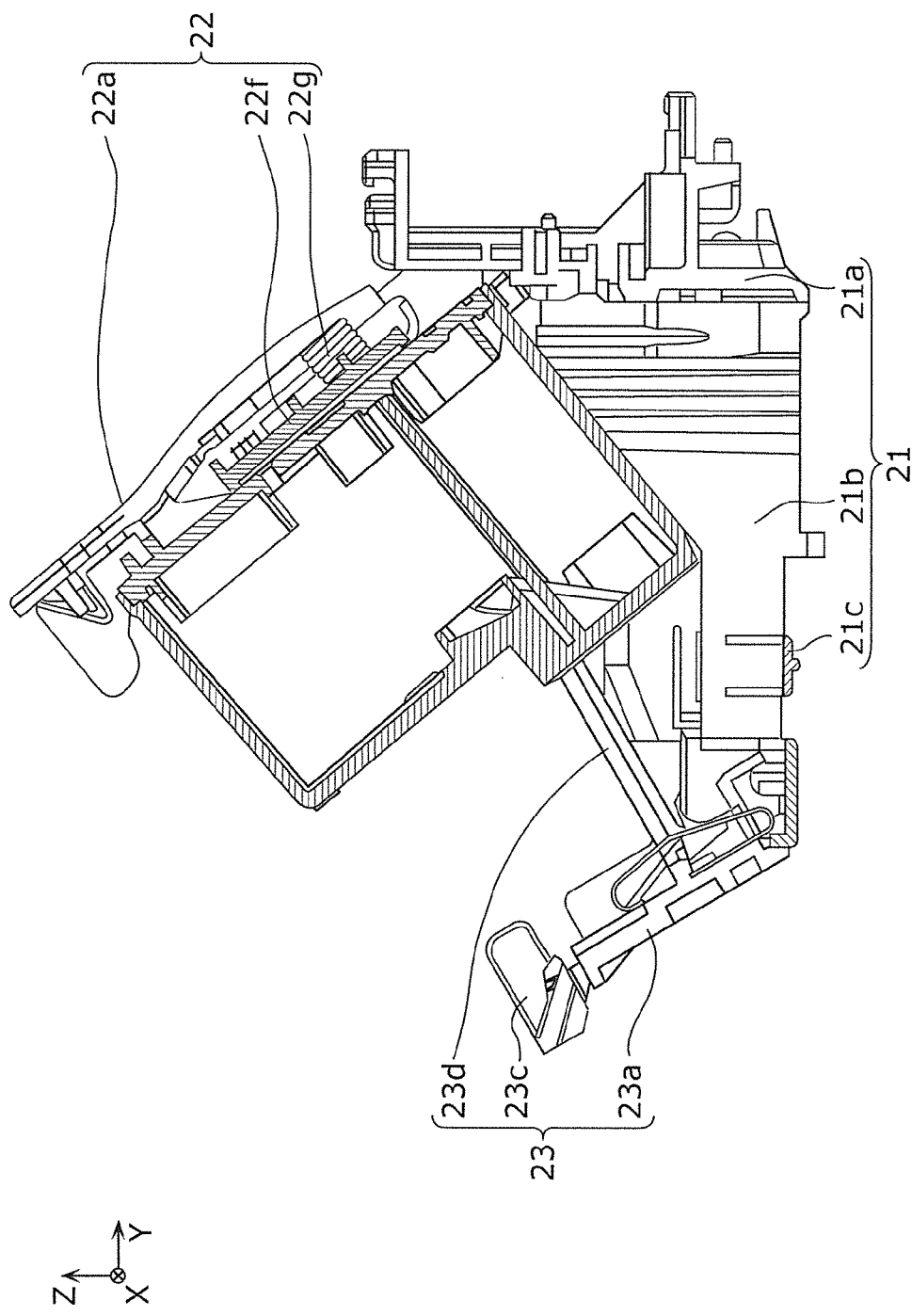

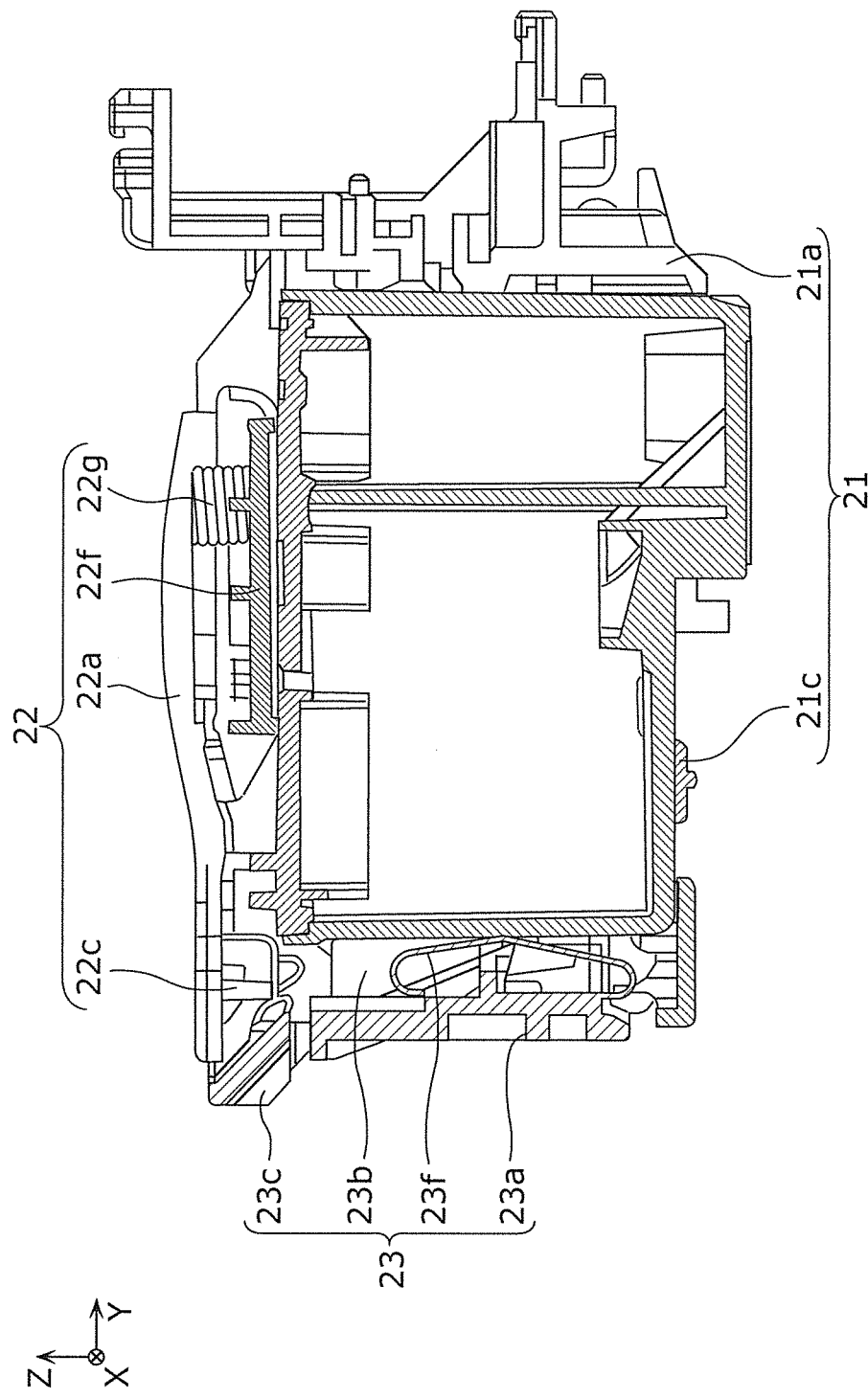

PRINTER

CROSS REFERENCE TO RELATED APPLICATION

The present application is based on and claims priority of Japanese Patent Application No. 2014-086796 filed on Apr. 18, 2014. The entire disclosure of the above-identified applications, including the specifications, drawings and claims is incorporated herein by reference in its entirety.

FIELD

The present invention relates to printers, particularly printers that include a carriage for mounting an ink cartridge.

BACKGROUND

In addition to printers that only print, all-in-one (AIO) printers that include functions other than printing, such as scanning, are known. These AIO printers include, for example, a chassis having an opening in the top surface, a glass platen covering the opening in the chassis, a scanner beneath a glass platen, and a carriage for mounting an ink cartridge. The carriage is generally installed beneath the scanner within the chassis of the printer.

With printers including a carriage for mounting an ink cartridge, replacement of the ink cartridge must be done by a user. When replacing an ink cartridge, the user must, for example, unlock the ink cartridge loaded in the carriage, remove the ink cartridge from the carriage, load a new ink cartridge in the carriage, and lock the ink cartridge loaded in the carriage in place (for example, see Patent Literature (PTL) 1).

CITATION LIST

Patent Literature

[PTL 1] Japanese Unexamined Patent Application Publication No. 2005-81712

SUMMARY

Technical Problem

Conventional printers lack a sufficiently user friendly system for replacing an ink cartridge.

The present invention was conceived to overcome the above problem. Accordingly, an object of the present invention is to provide a printer with a more user friendly system for replacing an ink cartridge.

Solution to Problem

In order to achieve the above-described object, a printer according to one aspect of the present invention includes a carriage including: a first lid that holds an ink cartridge; a first axis of rotation located at a first end portion of the first lid; and an opening portion located at a second end portion of the first lid opposite the first end portion, wherein the first lid is rotatable between a first positional state and a second positional state about the first axis of rotation, and a location of the opening portion when the first lid is in the first positional state is higher than a location of the opening portion when the first lid is in the second positional state.

The first positional state is, for example, the positional state of the first lid when loading or unloading an ink cartridge (see FIG. 5A), and the second positional state is, for example, the positional state of the first lid when the printer is printing (see FIG. 5B).

With the above-described printer, since the opening portion of the first lid is angled upward when loading or unloading an ink cartridge (i.e., in the first positional state), loading and unloading of the ink cartridge is easier to do, thereby improving user friendliness. Moreover, the above-described printer has a simple structure, which inhibits an increase in cost.

For example, the carriage may further include: a lift that lifts the second end portion of the first lid by rotating the first lid about the first axis of rotation; and a restrictor that restricts upward movement of the second end portion of the first lid when the first lid is in the second positional state.

For example, the printer may further include: a scanner that scans an image depicted on a document; and a chassis including a platen disposed in a top surface, a standby space located outside a region below the platen, and a second lid disposed above the standby space, the platen being for placing the document, the standby space being for the carriage, and the second lid being openable and closable and for loading and unloading the ink cartridge.

Since the above-described printer is configured such that the ink cartridge is loaded and unloaded in the standby space located outside the heavy platen, there is no need to lift up the platen when loading and unloading an ink cartridge. Moreover, this configuration eliminates the need for a component for holding the platen in an open state. The component for holding the heavy platen tends to be expensive, so eliminating the need for the component makes it possible to keep costs down.

Furthermore, since the above-described printer is configured such that the ink cartridge is loaded and unloaded in the standby space for the carriage, the size of the printer can be kept under control.

For example, the second lid may include an operation panel for operating the printer.

Moreover, the ink cartridge may be a container having a top surface with a rectangular shape, the top surface may have, on opposing sides, two first edges that protrude beyond a side surface portion of the container, the two first edges may run perpendicular to the first axis of rotation while the ink cartridge is mounted in the carriage, the first lid may include a pair of side surface portions that are plate-shaped and disposed so as to sandwich the two first edges while the ink cartridge is loaded, the pair of side surface portions may each include a guide that is elongated and protrudes into a space where the ink cartridge is mounted, and the guides may be disposed such that top surfaces of the guides contact bottom surfaces of the two first edges of the ink cartridge while the ink cartridge is loaded.

Since the above-described printer includes guides that guide the ink cartridge into the carriage upon loading an ink cartridge into the carriage, the loading of an ink cartridge is simplified.

Moreover, the first lid may include a pair of side surface portions that are plate-shaped and disposed so as to sandwich side surfaces of the ink cartridge while the ink cartridge is loaded, the lift may be rotatable about a second axis of rotation located below the second end portion of the first lid, the second axis of rotation may be parallel to the first axis of rotation, the lift may include a contact portion that is elongated and extends radially from the second axis of rotation, and the contact portion may be contactable with at least one side surface portion among the pair of side surface portions from below.

Since the above-described printer includes a lift that lifts the lid holding the ink cartridge in order to unload the ink cartridge, placing the carriage in an open state is simple.

Moreover, the first lid may include a top portion that is plate-shaped and covers an area above a top surface of the ink cartridge, the lift may further include a second fitting that is plate-shaped and extends from the second axis of rotation in a direction perpendicular to the contact portion, and the second fitting may fit together with a first fitting included in the top portion to function as the restrictor.

Since the above-described printer includes a first fitting and a second fitting that secure the lid and the lift in place when printing, the ink cartridge can be favorably positioned when printing.

Moreover, the first lid may include a retainer that is plate-shaped and contacts the top surface of the ink cartridge while the ink cartridge is loaded.

Moreover, the first lid may include a first biasing component that, while the ink cartridge is loaded, biases the retainer toward a base that supports the ink cartridge from below to pin the ink cartridge down onto the base.

Moreover, the lift may include a second biasing component that, while the ink cartridge is loaded, biases the ink cartridge toward the first end portion of the first lid.

Moreover, the printer may further include a base that supports the ink cartridge from below and engages with a shaft that guides translation of the cartridge, and the first axis of rotation may be parallel to the shaft.

Moreover, the carriage may be capable of holding a plurality of the ink cartridges, and the first lid may hold the plurality of the ink cartridges such that the plurality of the ink cartridges are aligned parallel to the first axis of rotation.

Moreover, each of the plurality of the ink cartridges may be a container having a top surface with a rectangular shape, the top surface may have, on opposing sides, two first edges that protrude beyond a side surface portion of the container, the two first edges may run perpendicular to the first axis of rotation while the ink cartridge is mounted in the carriage, the first lid may include a plurality of side surface portions disposed so as to sandwich the two first edges of each of the plurality of the ink cartridges, while the plurality of the ink cartridges are loaded, the plurality of side surface portions may include a first side surface portion disposed between two ink cartridges among the plurality of the ink cartridges so as to be shared by the two ink cartridges, the first side surface portion including, on both sides, guides that are elongated and protrude into spaces where the plurality of the ink cartridges are mounted, the plurality of side surface portions may include two second side surface portions that are different than the first side surface portion, the two second side surface portions including, on sides facing the plurality of the ink cartridges, the guides that are elongated and protrude into the spaces where the plurality of the ink cartridges are mounted, and the guides may be disposed such that top surfaces of the guides contact bottom surfaces of the two first edges of each of the plurality of the ink cartridges while the plurality of the ink cartridges are loaded.

Moreover, the printer may further include: a lift that lifts the second end portion of the first lid by rotating the first lid about the first axis of rotation; and a restrictor that restricts upward movement of the second end portion of the first lid when the first lid is in the second positional state, wherein the lift may be rotatable about a second axis of rotation located below the second end portion of the first lid, the second axis of rotation may be parallel to the first axis of rotation, the lift may include a contact portion that is elongated and extends radially from the second axis of rotation, and the contact portion may be contactable with at least one side surface portion among the plurality of side surface portions from below.

Moreover, the first lid may include a top portion that is plate-shaped, provided in common for the plurality of the ink cartridges, and covers an area above the top surfaces of the plurality of the ink cartridges, the lift may further include a second fitting that is plate-shaped and extends from the second axis of rotation in a direction perpendicular to the contact portion, and the second fitting may fit together with a first fitting included in the top portion to function as the restrictor.

Advantageous Effects

The present invention provides a more user friendly ink cartridge replacement system.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 5A is a cross sectional view of one example of a carriage according to an embodiment while the carriage is open.

FIG. 5B is a cross sectional view of one example of a carriage according to an embodiment while the carriage is closed.

DESCRIPTION OF EMBODIMENT

Technical Problem in More Detail

Particularly with conventional printers that include a scanner, ink cartridges are replaced by lifting up the glass platen to access the opening of the chassis, and accessing the ink cartridge through the opening of the chassis.

These printers require a hinge mechanism capable of holding the heavy weight of the glass platen while in the up position. These printers also inconvenience the user by requiring the heavy glass platen to be lifted up.

In light of these problems, printers have been designed which allow the user to replace an ink cartridge from an opening in the front of the printer chassis for ejecting a printed document.

Although these printers do not require the user to lift up the glass platen, they are further inconvenient since the system of replacing the ink cartridges through the opening provided in the front of the printer chassis reduces the visibility of the ink cartridges.

Note that with printers including a scanner, by arranging the ink cartridge replacement location to be below an operation panel positioned beside the glass platen, the need to lift the heavy glass platen can be eliminated. However, when the ink cartridge replacement location is provided below the operation panel, the size of the opening used to replace the ink cartridges is limited since the surface area of the region including the operation panel is smaller than the surface area of the glass platen. Moreover, as described above, since the carriage is provided deep in the chassis in printers that include a scanner, there is even more of a need to improve the user friendliness of replacing the ink cartridges for the user.

Hereinafter, an illustrative embodiment is described in greater detail with reference to the accompanying Drawings. Note that the Drawings are schematic drawings, and may not depict exact dimensions or dimensional ratios.

The illustrative embodiment described below shows a general or specific example. The numerical values, shapes, structural elements, the arrangement and connection of the structural elements, steps, the processing order of the steps etc. shown in the following illustrative embodiment are mere examples, and therefore do not limit the scope of the present invention, which is limited by the appended Claims. Therefore, among the structural elements in the following illustrative embodiment, structural elements not recited in any one of the independent claims are described as preferred structural elements, and are not absolutely necessary to overcome the problem according to the present invention.

Embodiment

The embodiment will be described hereinafter with reference to FIG. 1 through FIG. 6B.

In this embodiment, the printer is exemplified as an ink jet printer. Note that the printer is not limited to an ink jet printer; so long as the printer requires the user to replace the ink cartridge, the printer may be a different kind of printer, such as an all-in-one printer including, for example, a scanner.

1-1 Printer

Figure 1:
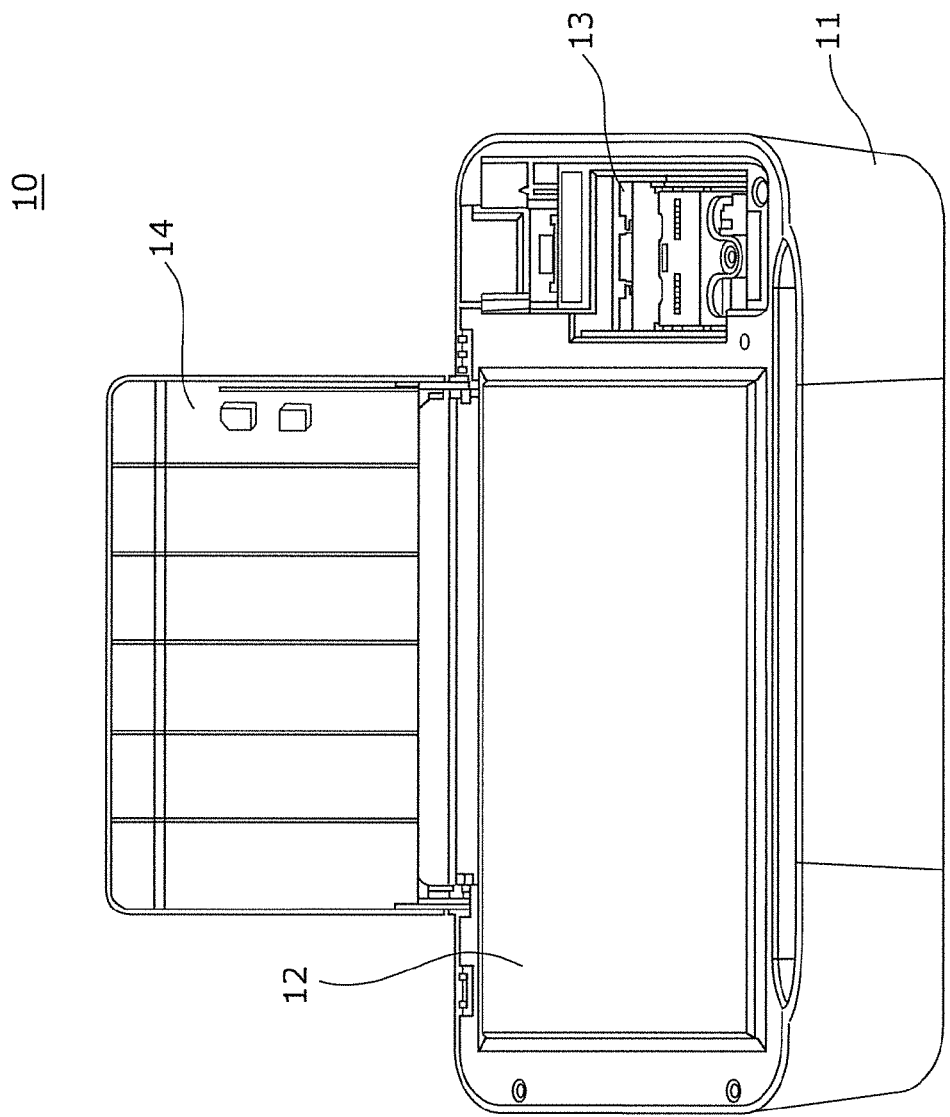
FIG. 1 illustrates an external view of one example of a printer according to an embodiment.
Figure 2A:
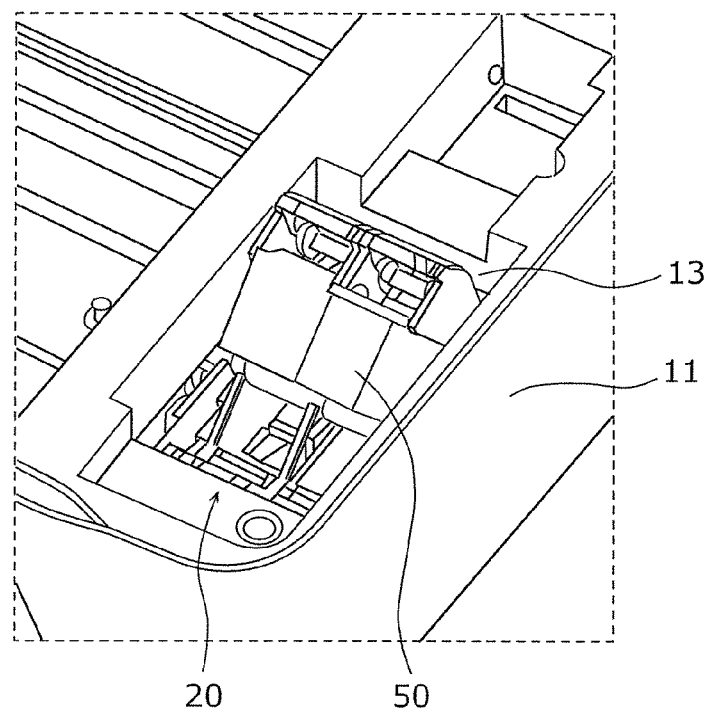
FIG. 2A is an enlarged view of a standby space of the printer illustrated in FIG. 1.
Figure 2B:
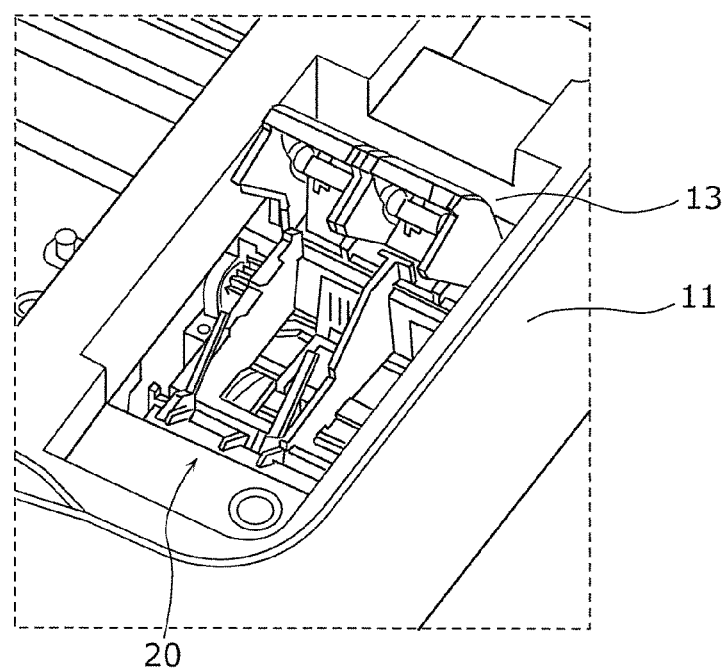
FIG. 2B is an enlarged view of a standby space of the printer illustrated in FIG. 1.

FIG. 1 illustrates an external view of one example of the printer according to this embodiment. FIG. 2A and FIG. 2B are enlarged views of the standby space 13 of the printer 10 illustrated in FIG. 1.

In FIG. 1, the X axis corresponds to the widthwise direction of the printer 10, the Y axis corresponds to the depthwise direction of the printer 10, and the Z axis corresponds to the vertical direction of the printer 10.

The printer 10 according to this embodiment includes a printing function and a scanner, as described above.

A glass platen 12 (as illustrated in FIG. 1), which is one example of the platen on which a document to be scanned is placed, and an operation panel the user uses to operate the printing and scanning functions of the printer 10 (not illustrated in the Drawings) are disposed in the top surface of the chassis 11 of the printer 10.

The operation panel is removable from the printer 10 (or openable and closable), and doubles as a lid (second lid) that covers the standby space 13 for loading and unloading the ink cartridge 50. Note that in FIG. 1, the operation panel is removed to illustrate the standby space 13 inside the printer 10.

The scanner is disposed directly below the glass platen 12 within the chassis 11.

A carriage 20 and a shaft (carriage rod) 30 that guides translation of the carriage 20 are disposed below the space where the scanner is disposed in the chassis 11. The shaft 30 extends in a direction perpendicular to the direction in which the recording medium is transported through the printer 10 (negative direction of the Y axis), i.e., parallel to the lengthwise direction of the printer 10 (i.e., the X axis). The length and attachment position of the shaft 30 are so designed as to cover the entire printing region. Note that the carriage 20 and the shaft 30 will be described in detail later. Note that in this embodiment, "recording medium" refers to a medium that is capable of being printed on with an ink jet printer, such as paper, a disc label, or transparencies for overhead projectors.

A path for transporting the recording medium is formed in the chassis 11, below the carriage 20. When the recoding medium is positioned below the carriage 20, ink is ejected from the print head of the ink cartridge mounted in the carriage 20 and printed on the recording medium.

As illustrated in FIG. 1, the standby space 13 for the carriage 20 in the chassis of the printer 10 is located below the operation panel, outside the region below the glass platen 12.

The standby space 13 is a space for servicing the ink cartridge 50, and houses, for example, a cap for protecting the print head 53 and a wiper for cleaning ink buildup off the nozzle surface of the print head 53.

A tray 14 from which the recording medium is fed into the printer 10 is disposed at the rear of the printer 10.

1-2 Ink Cartridge

In this embodiment, the ink cartridge mounted in the carriage will be described with reference to FIG. 3. Note that in this embodiment, two types of ink cartridges—monochrome and color ink cartridges—are used. Other than their number of print heads, monochrome and color ink cartridges have the external shape. The monochrome ink cartridge can be filled with black ink, and the color ink cartridge can be filled with yellow (Y), magenta (M), and cyan (C) ink.

Figure 3:
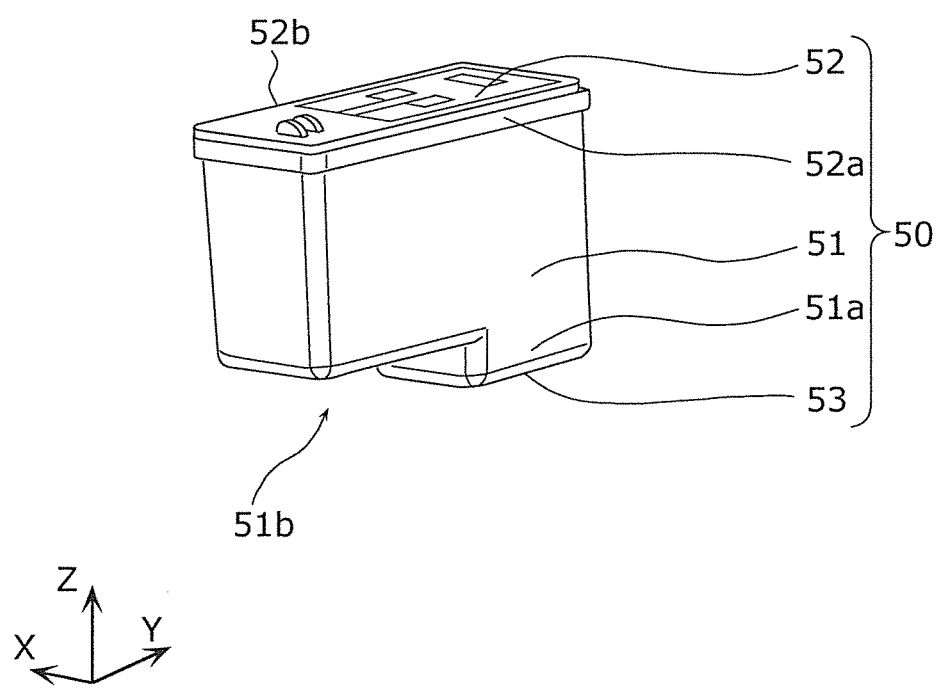
FIG. 3 illustrates an external view of one example of an ink cartridge according to an embodiment.

FIG. 3 illustrates an external view of one example of the ink cartridge according to this embodiment. Note that the X, Y, and Z axes in FIG. 3 correspond to the X, Y, and Z axes of the printer 10 when ink cartridge 50 is mounted in the carriage 20 of the printer 10. In this embodiment, the ink cartridge 50 is a hollow, substantially cuboid container 51, as illustrated in FIG. 3.

According to this embodiment, the container 51 is deeper (Y axis length) than it is wide (X axis length).

The bottom of the container 51 includes a step that gives the container 51 two different heights. In other words, the container 51 includes a substantially cuboid cut-out portion (the recessed portion 51b in FIG. 3) in the bottom front portion relative to when the ink cartridge 50 is mounted in the carriage. Consequently, the back half (approximately) of the bottom portion relative to when the ink cartridge 50 is mounted in the carriage has the shape of a protrusion 51a protruding downward. In the case of the monochrome ink cartridge, one print head 53 is disposed on the bottom of the protrusion 51a, and in the case of the color ink cartridge, three print heads 53 are disposed on the bottom of the protrusion 51a. The number of print heads 53 is determined according to the number of ink colors filled in the ink cartridge 50.

The stepped container 51 includes a first bottom surface (i.e., the bottom surface of the protrusion 51a) a second bottom surface (i.e., the bottom surface of the container 51 excluding the bottom surface of the protrusion 51a). The first bottom surface is further from the top surface and the second bottom surface is closer to the top surface. The surface area of the first bottom surface is less than the surface area of the second bottom surface.

Note that in this embodiment, the print head 53 and the ink cartridge are exemplified as being integrally formed, but the print head 53 may be formed separate from the ink cartridge, such as on the carriage.

The container 51 includes a rectangular top surface 52 that is greater in surface area than the bottom surface of the container 51.

The two first edges 52a and 52b of the top surface 52 are parallel lengthwise (along the Y axis) and protrude beyond the side surfaces of the container 51. Note that the two first edges 52a and 52b are perpendicular to the first axis of rotation while the ink cartridge 50 is mounted in the carriage 20.

1-3 Carriage

FIG. 4A through FIG. 6B illustrate one example of the carriage according to this embodiment.

Figure 4A:
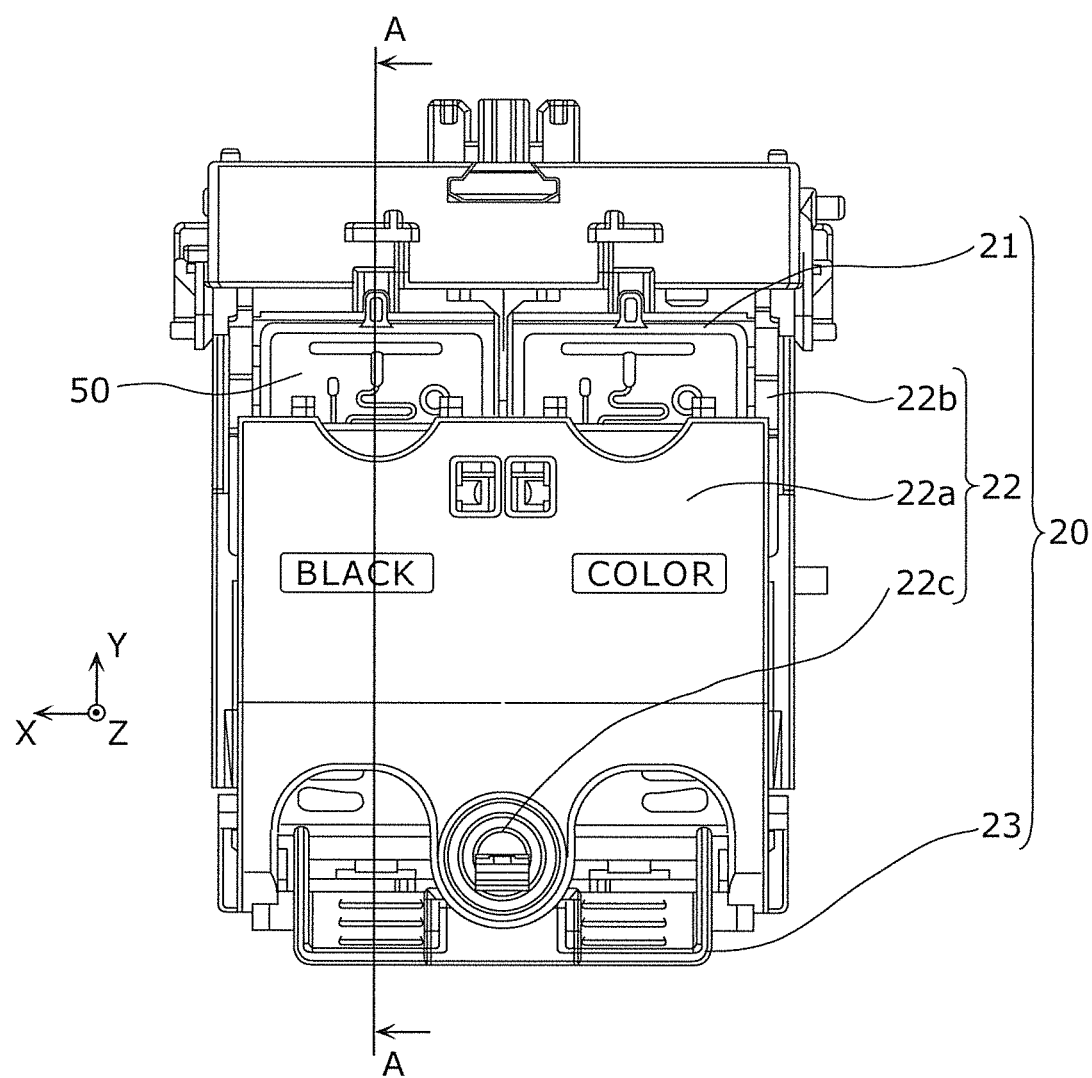
FIG. 4A illustrates an external view of a carriage according to an embodiment from the perspective of a vertical direction.
Figure 4B:
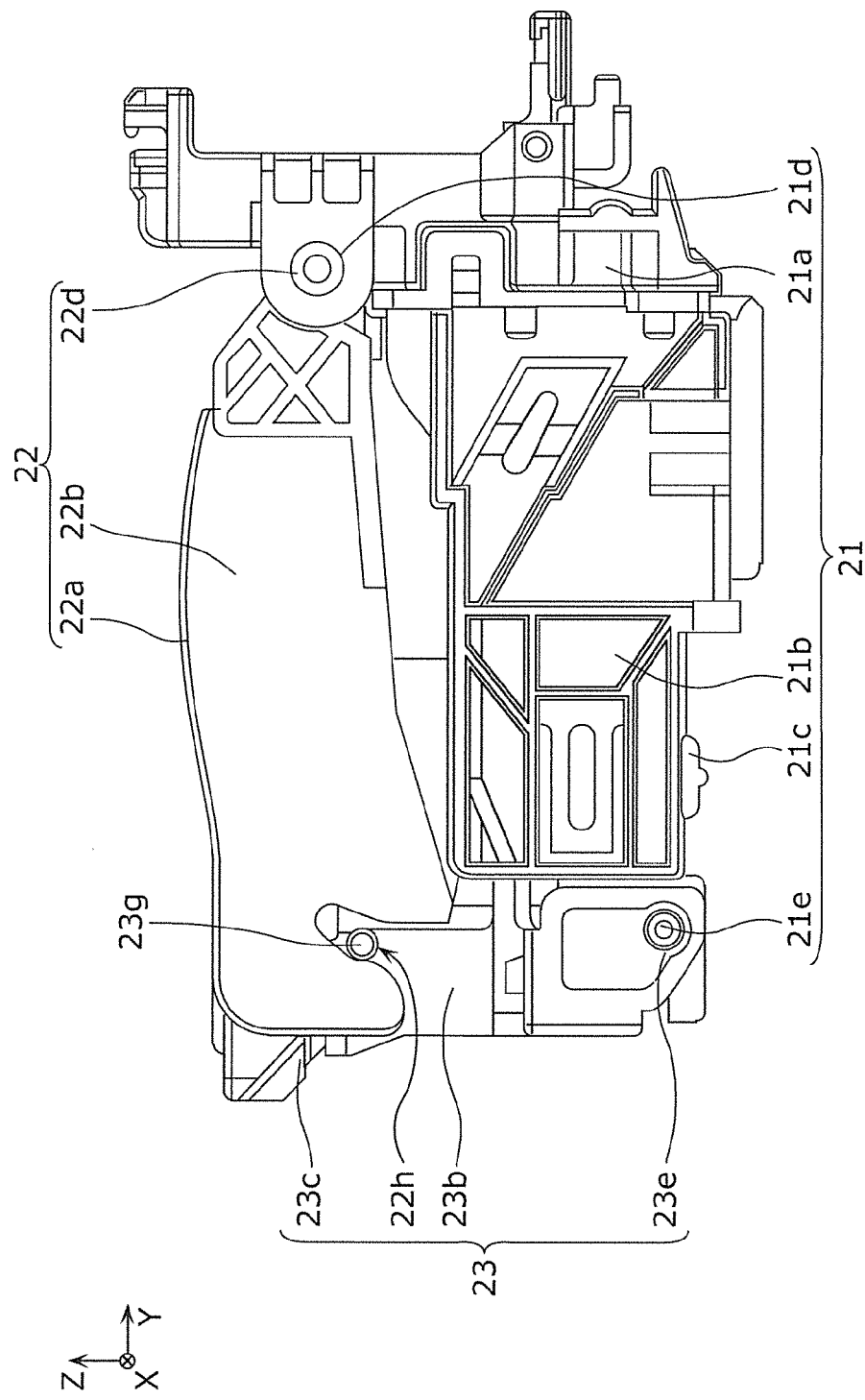
FIG. 4B illustrates an external view of a carriage according to an embodiment from the perspective of a horizontal direction.
Figure 6A:
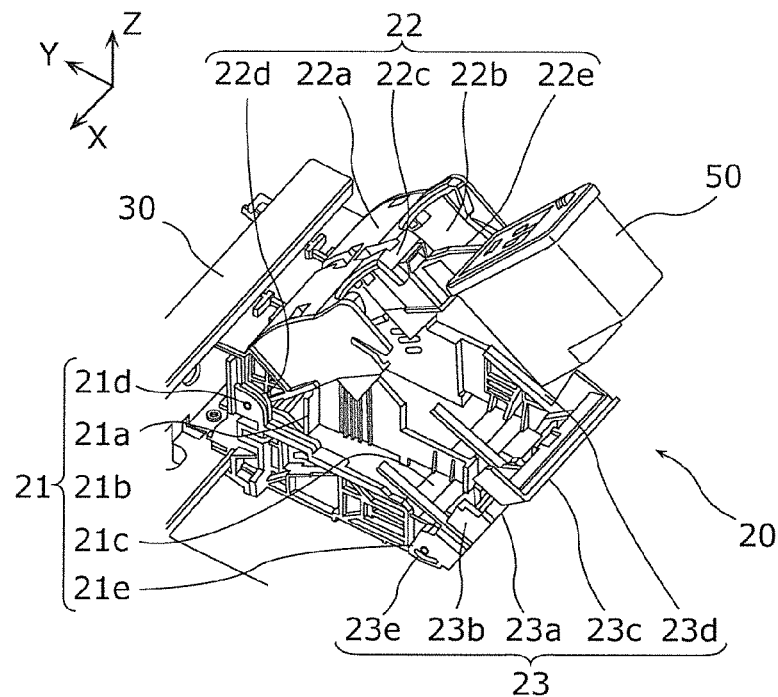
FIG. 6A is a perspective view of a carriage according to an embodiment.
Figure 6B:
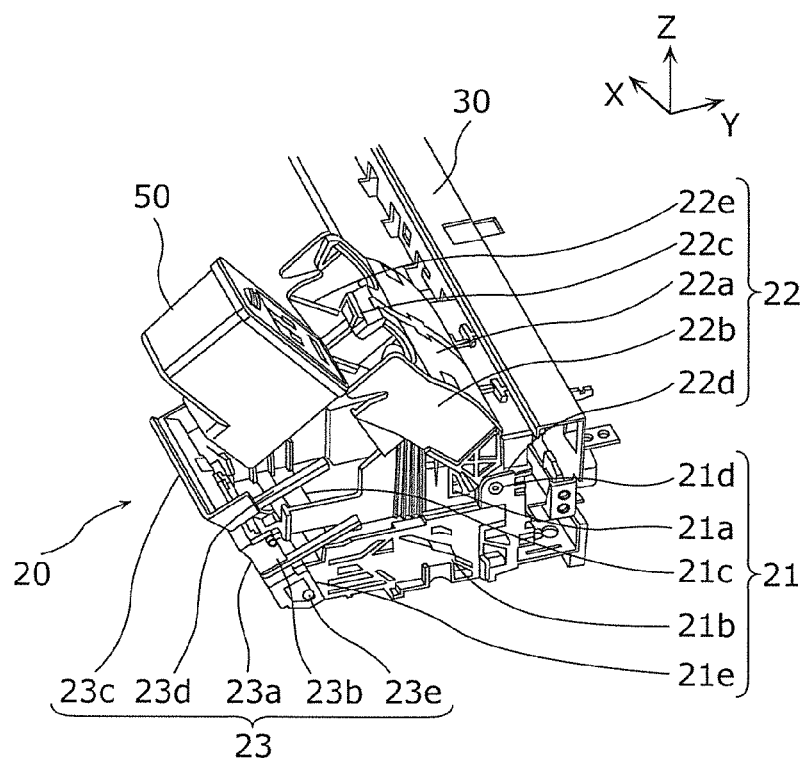
FIG. 6B is a perspective view of a carriage according to an embodiment.

FIG. 4A illustrates an external view of the carriage according to this embodiment from the perspective of the Z axis (vertical direction). FIG. 4B illustrates an external view of the carriage according to this embodiment from the perspective of the X axis (widthwise direction). FIG. 5A is a cross sectional view of one example of the carriage according to this embodiment while the carriage is open (one example of the first positional state). FIG. 5B is a cross sectional view of one example of the carriage according to this embodiment while the carriage is closed (one example of the second positional state. The cross sections in FIG. 5A and FIG. 5B are taken at the line AA illustrated in FIG. 4A. FIG. 6A and FIG. 6B are perspective views of the carriage according to this embodiment.

According to this embodiment, the carriage 20 can accommodate two ink cartridges 50—a monochrome ink cartridge and a color ink cartridge. The carriage 20 may be, for example, a plastic component, a metal component, or a component including different types of material.

The carriage 20 holds the ink cartridge 50, and as is illustrated in FIG. 4A, etc., includes a base 21, a lid (first lid) 22, and a lift 23.

1-3-1 Base

The base 21 engages with the edges of the shaft 30, as illustrated in FIG. 4B, FIG. 6A, and FIG. 6B in particular. The base 21 includes a first side surface portion 21a, a second side surface portion 21b, a bottom surface holding portion 21c, a first rotating portion 21d, and a second rotating portion 21e.

When the ink cartridge 50 is loaded in the carriage 20, the first side surface portion 21a contacts the back surface of the ink cartridge 50 and secures the ink cartridge 50 in place. The first side surface portion 21a is designed to have a Z axis length that extends from the bottom of the second side surface portion (to be described later)—that is, the vicinity of the bottom surface of the protrusion 51a of the ink cartridge 50 while the ink cartridge 50 is loaded—to above the top portion 22a (to be described in detail later) of the lid 22 while the ink cartridge 50 is loaded. The first side surface portion 21a is designed to have an X axis length that is substantially equal to the distance between the first plate-shaped components (to be described in detail later) included in the second side surface portion 21b.

In this embodiment, a portion of the side of the first side surface portion 21a that faces the ink cartridge 50 is in contact with the ink cartridge 50. The surface of the first side surface portion 21a that is in contact with the ink cartridge 50 is designed to be parallel to the X axis and vertical directions such that the side surfaces of the ink cartridge 50 are held parallel to a substantially vertical direction while the printer is printing.

The first side surface portion 21a also includes, on the bottom portion of the side that does not contact the ink cartridge 50 (i.e., the outside of the first side surface portion 21a), a component for engaging with the shaft 30.

The top portion of the first side surface portion 21a also includes a first axis of rotation that is parallel to the X axis.

The second side surface portion 21b includes plate-shaped components that cover the side surfaces of the ink cartridge 50 when the ink cartridge 50 is loaded. However, in this embodiment, the second side surface portion 21b does not directly contact the ink cartridge 50. The second side surface portion 21b is integrally formed with the first side surface portion 21a.

In this embodiment, since the carriage 20 holds two ink cartridges 50, the second side surface portion 21b includes three plate-shaped components. The three plate-shaped components include two first plate-shaped components that form part of the chassis of the carriage 20, and one second plate-shaped component disposed between the two ink cartridges 50. Note that when the carriage 20 can accommodate only one ink cartridge 50, the second plate-shaped component may be omitted, and when the carriage 20 can accommodate three or more ink cartridges 50, the number of second plate-shaped components provided may be one less than the number of ink cartridges 50. The plate-shaped components included in the second side surface portion 21b may be shaped differently. For example, in this embodiment, the second plate-shaped component is shaped such that the rear portion (the portion in the positive direction of the Y axis) is taller (greater in the Z axis length) than the front portion (the portion in the negative direction of the Y axis). Moreover, for example, the first plate-shaped component may have a strength that is strong enough to support the ink cartridge 50. Moreover, the surfaces of the plate-shaped components may include structural reinforcements such as ribs. Moreover, in this embodiment, the second side surface portion 21b is disposed such that the surface is perpendicular to the first axis of rotation and the second axis of rotation.

As illustrated in FIG. 6A and FIG. 6B, the bottom surface holding portion 21c includes an elongated plate-shaped component that is attached to bottom surfaces of the three plate-shaped components of the second side surface portion 21b so as to form a bottom surface. The bottom surface holding portion 21c is attached such that the lengthwise direction thereof is parallel to the first axis of rotation and the second axis of rotation. In this embodiment, the bottom surface holding portion 21c is disposed so as to contact the bottom surface of the recessed portion 51b (second bottom surface) of the ink cartridge 50. The length (X axis length) of the bottom surface holding portion 21c is the same as the length of the gap between the first plate-shaped components included in the second side surface portion 21b. The depth (Y axis length) of the bottom surface holding portion 21c ranges from approximately a few millimeters to one centimeter, and is shorter than the depth (Y axis length) of the second bottom surface of the ink cartridge 50. The thickness (Z axis length) of the bottom surface holding portion 21c is of a degree that allows the bottom surface holding portion 21c to support the second bottom surface of the ink cartridge

50. The thickness of the bottom surface holding portion 21c varies depending on the material of the bottom surface holding portion 21c.

The first rotating portion 21d is a component that, in conjunction with a third rotating portion 22d (to be described later) of the lid 22, allows the lid 22 to rotate with respect to the base 21, between an open state and a closed state. The first rotating portion 21d is disposed at the top back portion of the second side surface portion 21b, in a location including the first axis of rotation parallel to the X axis located on the top portion of the shaft 30. More specifically, the first rotating portion 21d includes two plate-shaped components disposed at the top portions of two edges of the first side surface portion 21a that are parallel to the Z axis. The two plate-shaped components extend from the ends of these two edges in the negative direction of the Y axis. The first rotating portion 21d is positioned such that the first axis of rotation is located in a central portion of the first rotating portion 21d. The first rotating portion 21d has a circular opening having a center axis that is aligned with the first axis of rotation. More specifically, the circular opening in the first rotating portion 21d is formed so as to accommodate the cylindrical third rotating portion 22d included in a third side surface portion 22b (to be described later) of the lid 22. Two cylindrical third rotating portions 22d protrude in opposite directions. The lid 22 can thus rotate about the first axis of rotation with this simple configuration of providing the lid 22 with the third rotating portion 22d and providing the base 21 with the first rotating portion 21d. Note that the first rotating portion 21d may be provided on the second side surface portion 21b.

The second rotating portion 21e is a component that, in conjunction with a fourth rotating portion 23e of the lift 23 (to be described later), allows the lift 23 to rotate with respect to the base 21. The second rotating portion 21e is provided on each of the two first plate-shaped components included in the second side surface portion 21b. The second rotating portion 21e includes a cylindrical component having a center axis that is aligned with the second axis of rotation, which is parallel to the X axis and located on the lower front portion of the second side surface portion 21b. The cylindrical component included in the second rotating portion 21e fits through the circular opening in the fourth rotating portion 23e of the lift 23 (to be described later), allowing the lift 23 to rotate about the second axis of rotation. The second rotating portion 21e is designed to have a diameter that is slightly smaller than the diameter of the round opening in the fourth rotating portion 23e.

1-3-2 Lid

The lid 22 is a component which removably holds the ink cartridge 50 and covers at least a portion of the top surface and side surface of the ink cartridge 50 while the printer is printing.

Moreover, the lid 22 is rotatable about the first axis of rotation while the ink cartridge 50 is held in the lid 22. Note that in this embodiment, the first axis of rotation is parallel to the direction of translation of the carriage 20. As described above, the first axis of rotation is located at the top portion of the first side surface portion 21a of the base 21.

The lid 22 also has an opening portion for loading and unloading the ink cartridge. The opening portion is provided at an end portion (second end portion) of the lid 22 opposite the end portion (first end portion) at which the first axis of rotation is located. The lid 22 and the lift 23 (to be described later) are, when the printer is printing, connected together and secure the ink cartridge 50 in place. Moreover, when loading and unloading the ink cartridge 50, the lid 22 and the lift 23 (to be described later) rotate in opposite directions. This opens a space toward the second end portion of the lid 22, between the lid 22 and the lift 23, for loading and unloading the ink cartridge 50.

As illustrated in FIG. 4A through FIG. 6B, the lid 22 includes the top portion 22a, the third side surface portion 22b, a first fitting 22c, the third rotating portion 22d, a guide 22e, a retainer 22f, and a first spring 22g.

The top portion 22a is a substantially rectangular plate-shaped component that defines a portion of the chassis of the carriage 20, and covers the ink cartridge 50 while the ink cartridge 50 is secured in place.

In this embodiment, when the ink cartridge 50 is loaded, the top portion 22a occupies a region from above the print head 53 to above the lift 23 (to be described later), as illustrated in, for example, FIG. 4A. In other words, the longitudinal length (Y axis length) of the top portion 22a spans the distance between a point above the print head 53 and a point above the lift 23, when the ink cartridge 50 is loaded. Moreover, the horizontal width (X axis length) of the top portion 22a is the same as the horizontal width of the carriage 20. In this embodiment, the top portion 22a slightly bulges in the area above the center portion of the ink cartridge 50. Furthermore, in this embodiment, a circular arc is cut out of the front portion of the top portion 22a above each ink cartridge 50 so that the ink cartridge 50 can be seen from above. Each circular arc cut-out is smaller in diameter than the horizontal width of the ink cartridge 50. The first fitting 22c is disposed between the circular arc cut-outs. The elongated portions on both sides of the circular arc cut-outs extend forward (in the negative direction of the Y axis) to the first fitting 22c, and then extend downward (in the negative direction of the Z axis). In other words, in this embodiment, the elongated portion is formed to have a circular arc shaped cross section in the central portion.

As illustrated in FIG. 4B, FIG. 6A, and FIG. 6B, the third side surface portion 22b defines a portion of the chassis of the carriage 20, and includes a pair of plate-shaped components (pair of side surface portions) disposed so as to sandwich the two side surfaces contacting the long edge of the ink cartridge 50 while the ink cartridge 50 is loaded. When perpendicular to the first axis of rotation, the third side surface portion 22b is provided in front (in the negative direction of the Y axis) of the first axis of rotation. Among the two long edges of the third side surface portion 22b that extend along the Y axis, the top edge has a contour that matches the top portion 22a. More specifically, the contour of the central portion of the top edge bulges upward. Moreover, the portion between the top edge and the short edge nearest the lift 23 among the two short edges parallel to the Z axis has a circular arc shape. Among the two long edges of the third side surface portion 22b that extend along the Y axis, the bottom edge has a contour that slightly slopes downward from the first axis of rotation. In other words, the height (Z axis length) of the third side surface portion 22b increases from the first axis of rotation toward the lift 23. The third side surface portion 22b includes, in the front bottom corner, a cut-out portion 22h for guiding a cylindrical component 23g of the lift 23 (to be described later). The cut-out portion 22h has the contour of a curved line that extends from the front short edge of the third side surface portion 22b to a height around the central portion of the short edge, and then extends toward the bottom edge. By shaping the cut-out portion 22h in this manner, when the ink cartridge 50 is loaded and the lid 22 and the lift 23 are rotated into the secured position, the cylindrical component 23g of the lift 23 can be accurately guided to an appropriate position, allowing for smooth assembly with the lift 23.

As illustrated in FIG. 4A, FIG. 6A, and FIG. 6B, the first fitting 22c fits together with the second fitting 23c of the lift 23 to secure the lid 22 and the lift 23 in place. This secures the ink cartridge 50 in place. The first fitting 22c is disposed between the two cut-outs formed in the top portion 22a, and the part that connects with the top portion 22a is flexible such that the first fitting 22c can be bent downward. A protruding portion is formed on the inner surface of the first fitting 22c. The top surface of the protruding portion of the first fitting 22c latches to the bottom surface of a protruding portion formed on the second fitting 23c of the lift 23 (to be described later) to function as a restrictor that restricts upward movement of the end portion of the lid 22 toward the opening portion (i.e., the second end portion of the lid 22). The top surface of the protruding portion of the first fitting 22c is formed to be a planar surface having enough surface area to be able to favorably contact the bottom surface of the second fitting 23c.

The third rotating portion 22d is a component that, in conjunction with the above-described first rotating portion 21d, allows the lid 22 to rotate with respect to the base 21. Moreover, the third rotating portion 22d is cylindrical component disposed toward the back of third side surface portion 22b. The third rotating portion 22d is integrally formed with the third side surface portion 22b. The diameter of the third rotating portion 22d is slightly smaller than the diameter of the first rotating portion 21d, and of a size that allows the lid 22 to rotate smoothly without rattling.

The guide 22e is a component that guides the ink cartridge 50 into the interior of the lid 22 when loading the ink cartridge 50. As described above, the first edges 52a and 52b of the top surface 52 of the ink cartridge 50 extend beyond the side surfaces, and when loading the ink cartridge 50, the bottom surfaces of these protruding first edges 52a and 52b are placed into contact with the top surface of the guide 22e. As illustrated in FIG. 6A and FIG. 6B, the guide 22e is formed along the bottom edge of the third side surface portion 22b, from the meeting point of the bottom edge of the third side surface portion 22b and the cut-out portion 22h to the vicinity of the first axis of rotation. The top surface of the guide 22e is formed to be an elongated protruding portion so as to come into favorable contact with the bottom surfaces of the first edges 52a and 52b of the ink cartridge 50. How far inward the guide 22e protrudes is determined based on how far outward the first edges 52a and 52b of the ink cartridge 50 protrude.

As illustrated in FIG. 5A and FIG. 5B, the retainer 22f is a plate-shaped component that contacts the top portion of the ink cartridge 50 when loading the ink cartridge 50. As described above, since the part of the top portion 22a above the ink cartridge 50 bulges outward, a space is formed between the top of the central portion of the ink cartridge 50 and the top portion 22a. Along with the first spring 22g (to be described later), the retainer 22f is disposed in this space. The retainer 22f receives the downward force exerted by the first spring 22g and pushes down on the top surface of the ink cartridge 50 from above, pressing the ink cartridge 50 into the bottom surface holding portion 21c to secure the ink cartridge 50 in place.

The first spring 22g is one example of a biasing component that exerts downward force onto the retainer 22f toward the ink cartridge 50, and, along with the retainer 22f, secures the ink cartridge 50 with regard to vertical translation. In this embodiment, the first spring 22g is a coil spring with one end connected to the top portion 22a and the other end connected to the retainer 22f. Note that the first spring 22g may be a different type of spring.

1-3-3 Lift

The lift 23 lifts the end portion of the lid 22 toward the opening portion (i.e., the second end portion of the lid 22) by rotating the lid 22 about the first axis of rotation.

As illustrated in FIG. 4B, FIG. 5A, FIG. 6A, FIG. 6B, etc., the lift 23 includes a fourth side surface portion 23a, a fifth side surface portion 23b, the second fitting 23c, a contact portion 23d, a fourth rotating portion 23e, a second spring 23f, and the cylindrical component 23g.

The fourth side surface portion 23a is a substantially rectangular plate-shaped component that defines a portion of the chassis of the carriage 20, and is disposed so as to be parallel to the front surface of the ink cartridge 50 while the ink cartridge 50 is secured in place. The horizontal width (X axis length) of the fourth side surface portion 23a is shorter than the horizontal width of the lid 22.

The fifth side surface portion 23b includes a pair of rectangular plate-shaped components that define a portion of the carriage 20, and extend, in the Y axis direction, from the edge of the fourth side surface portion 23a parallel to the Z axis. The horizontal width (Y axis length) of the fifth side surface portion 23b is of a length that provides a sufficient amount of strength to the lift 23. As described above, since the horizontal width of the fourth side surface portion 23a is shorter than the horizontal width of the lid 22, the fifth side surface portion 23b is positioned further inward than the third side surface portion 22b of the lid 22 when the ink cartridge 50 is secured in place.

As described above, the second fitting 23c fits together with the first fitting 22c of the lid 22 to secure the lid 22 and the lift 23 in place, as illustrated in FIG. 4A, FIG. 6A, and FIG. 6B. The second fitting 23c is disposed on top of the fourth side surface portion 23a, and includes a protruding portion that protrudes away from the chassis. The bottom surface of the second fitting 23c is formed to be a planar surface having enough surface area to be able to favorably contact the top surface of the first fitting 22c. Note that the two contacting surfaces of the first fitting 22c and the second fitting 23c may slope down and away from the chassis so that the first fitting 22c and the second fitting 23c can fit together more easily.

The contact portion 23d includes a plurality of rod-shaped components that extend inward from the fourth side surface portion 23a. In other words, while the printer is printing, the plurality of rod-shaped components extend from the second axis of rotation side toward a region below the pair of side surface portions. Each of the rod-shaped components contacts, from below, the end surface of the plate-shaped components included in the third side surface portion 22b of the lid 22. The number of rod-shaped components provided is equal to the number of plate-shaped components included in the third side surface portion 22b of the lid 22.

In this embodiment, the fourth rotating portion 23e has a circular opening having a center axis that is aligned with the second axis of rotation provided in each of the pair of rectangular plate-shaped components included in the fifth side surface portion 23b. Fitting the second rotating portion 21e of the base 21 into the fourth rotating portion 23e allows the lift 23 to rotate.

The second spring 23f secures the ink cartridge 50 with regard to horizontal translation by pressing on the front surface of the ink cartridge 50 to press the ink cartridge 50 back when securing the ink cartridge 50 in place. In this embodiment, the second spring 23*f* is a linear spring, but the second spring 23*f* may be a different type of spring.

The cylindrical component 23*g* contacts the cut-out portion 22*h* of the lid 22 to guide the lid 22 upon closing the lid 22. The cylindrical component 23*g* is formed on the top portion of the fifth side surface portion 23*b*, protruding away from the chassis. The diameter of the cylindrical component 23*g* is smaller than the diameter of the fourth rotating portion 23*e*.

1-4 Carriage Operation

Next, changes in the state of the carriage 20 when loading and unloading the ink cartridge 50 will be discussed.

Note that unloading the ink cartridge 50 and loading a new ink cartridge 50 is done in the space below the operation panel of the printer 10, as illustrated in FIG. 2A and FIG. 2B.

1-4-1 Unloading the Ink Cartridge

To unload the ink cartridge 50 from the carriage 20, first the operation panel of the printer 10 is removed.

Next, the first fitting 22*c* of the lid 22 and the second fitting 23*c* of the lift 23 are separated (see, for example, FIG. 2A).

For example, the lift 23 is rotated about the second axis of rotation by pressing down on the second fitting 23*c* of the lift 23. This causes the contact portion 23*d* of the lift 23 to move upward and lift the third side surface portion 22*b* of the lid 22 up from below. As a result, the lid 22 rotates about the first axis of rotation whereby the first fitting 22*c* side of the lid 22 is lifted up. Here, the lid 22 and the lift 23 rotate in opposite directions, creating an opening between the lid 22 and the lift 23 large enough for loading and unloading the ink cartridge 50.

As a result, the front of the ink cartridge 50 rotates upward along with the lid 22, making the ink cartridge 50 visible from the opening, as illustrated in FIG. 2A.

Furthermore, as a result of the rotation of the lid 22 and the lift 23, the first spring 22*g* of the lid 22 no longer presses the ink cartridge 50 down, and the second spring 23*f* of the lift 23 no longer pushes the ink cartridge 50 back.

In this way, with the printer 10 according to this embodiment, the front end of the lid 22 holding the ink cartridge 50 extends upward causing the front of the ink cartridge 50 to angle upward, thereby simplifying the process of unloading the ink cartridge 50.

1-4-2 Loading the Ink Cartridge

FIG. 2B illustrates the standby space 13 unloaded with the ink cartridge 50. In this state, the opening portion (opened portion) of the lid 22 holding the ink cartridge 50 is angled upward, making access easier for the user. Hereinafter this will be described in further detail.

As illustrated in FIG. 6A and FIG. 6B, when loading the ink cartridge 50, after opening the carriage 20, the bottom surfaces of the first edges 52*a* and 52*b* of the top surface 52 of the ink cartridge 50 are brought into contact with the top surface of the guide 22*e* of the lid 22, and the ink cartridge 50 is slid in. As illustrated in FIG. 6A and FIG. 6B, when the carriage 20 is open, the top surface of the guide 22*e* is sloped down and to the back. Consequently, so long as a portion of the first edges 52*a* and 52*b* of the top surface 52 of the ink cartridge 50 are brought into contact with the guide 22*e* of the lid 22, gravity will pull the ink cartridge 50 into the lid 22, automatically bringing the ink cartridge 50 into its loaded position.

After the ink cartridge 50 is loaded into the lid 22, the lid 22 is rotated so as to move the end portion of the lid 22 opposite the first axis of rotation (i.e., the second end portion of the lid 22) downward. Rotation of the lid 22 can be accomplished by pushing the top surface of the lid 22 down from above. This causes the third side surface portion 22*b* of the lid 22 to move down and push the contact portion 23*d* of the lift 23 down from above.

This closes carriage 20 with the ink cartridge 50 mounted therein, as illustrated in FIG. 5B. In this state, the first spring 22*g* of the lid 22 presses down on the ink cartridge 50 and the second spring 23*f* of the lift 23 presses the ink cartridge 50 back. This accurately positions the ink cartridge 50 with respect to the carriage 20.

Next, the first fitting 22*c* of the lid 22 and the second fitting 23*c* of the lift 23 are fitted together to lock the carriage 20 closed.

Note that the lid 22 or the lift 23 may be provided with a lever to make rotation of the lid 22 and the lift 23 easier. A biasing component that applies an upward biasing force to the end portion of the lid 22 opposite the first axis of rotation (i.e., the second end portion of the lid 22) may also be included.

1-5 Advantageous Effect

With the above-described printer, unloading the ink cartridge 50 is simple since the lid 22 is rotated such that the opening portion in the lid 22 is angled upward while the ink cartridge 50 is held in the lid 22 of the carriage 20. Similarly, since the opening portion in the lid 22 is angled upward after unloading the ink cartridge 50, loading a new ink cartridge 50 is simple.

Furthermore, in the above embodiment, since the lid 22 includes the guide 22*e*, the ink cartridge 50 can be automatically (by gravity) placed back into its loaded position in the lid 22 simply by bringing the bottom surfaces of the edges of the top surface of the ink cartridge 50 into contact with the guide 22*e*. This configuration makes installing the ink cartridge 50 even easier.

Furthermore, in the above-described printer, since the operation panel is openable and closable and loading and unloading of the ink cartridge 50 is done at the location of the operation panel, there is no need to lift up the heavy glass platen 12 upon loading and unloading the ink cartridge 50. This configuration improves the user friendliness of the printer.

Moreover, since the printer according to the above embodiment eliminates the need for a component capable of holding the heavy weight of the glass platen 12 while in the open state, the number of components of the printer can be reduced, saving costs.

Moreover, since loading and unloading of the ink cartridge 50 is done in the standby space 13 below the operation panel, an increase in the size of the printer 10 can be controlled.

Furthermore, in general, with the printer 10 that includes a scanner, the carriage 20 is located deep within the chassis 11, but the carriage 20 according to the above embodiment is particularly useful since the opening portion of the carriage 20 angles up and widens when loading and unloading the ink cartridge 50.

Other Embodiments

Although the above describes the printer according to an illustrative embodiment of the present invention, the present invention is not limited to this illustrative embodiment.

(1) For example, the number of ink cartridges 50 capable of being mounted in the carriage 20 is not limited to two, and may be any given number.

(2) Moreover, in the above embodiment, the printer is exemplified as an ink jet printer including a scanner, but the printer is not limited to this example. Even if the printer is a printer that does not include a scanner, the loading and unloading of the ink cartridge 50 can be made easier by employing the configuration where the lid 22 rotates while holding the ink cartridge 50.

(3) In the above embodiment, the ink cartridge 50 is exemplified as being substantially cuboid in shape, but the shape of the ink cartridge 50 is not limited to this example. Moreover, in the above embodiment, the ink cartridge 50 is exemplified as having a step that gives the ink cartridge 50 two different depths, but structure of the ink cartridge 50 is not limited to this example. Moreover, the top surface of the ink cartridge 50 is rectangular in shape, but the top surface may have a shape that corresponds to a rectangle, such as a rectangle with rounded edges or a quadrilateral shape with rounded edges.

Moreover, various aspects of the above embodiment and the above variations may be combined.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The printer according to the above embodiment is applicable to printers that require replacement of an ink cartridge by a user, such as single function printers, photocopiers, or all-in-one printers.

The invention claimed is:

1. A printer comprising a carriage, the carriage including:
a first lid that holds an ink cartridge;
a first pivot axis located at a first end portion of the first lid;
an opening portion located at a second end portion of the first lid opposite the first end portion;
a lift that rotates about a second pivot axis located below the opening portion and contacts and lifts the first lid; and
a restrictor,
wherein the first lid is rotatable between a first position and a second position about the first pivot axis,
a location of the opening portion when the first lid is in the first position is higher than a location of the opening portion when the first lid is in the second position, and
the restrictor restricts upward movement of the second end portion when the first lid is in the second position.

2. The printer according to claim 1, further comprising:
a scanner that scans an image depicted on a document; and
a chassis including a platen disposed in a top surface, a standby space located outside a region below the platen, and a second lid disposed above the standby space, the platen being for placing the document, the standby space being for the carriage, and the second lid being openable and closable and for loading and unloading the ink cartridge.

3. The printer according to claim 2,
wherein the second lid includes an operation panel for operating the printer.

4. The printer according to claim 1,
wherein the ink cartridge is a container having a top surface with a rectangular shape, the top surface has, on opposing sides, two first edges that protrude beyond a side surface portion of the container,
the two first edges run perpendicular to the first pivot axis while the ink cartridge is mounted in the carriage,
the first lid includes a pair of side surface portions that are plate-shaped and sandwich the two first edges while the ink cartridge is loaded,
the pair of side surface portions each include a guide that is elongated and protrudes into a space where the ink cartridge is mounted, and
top surfaces of the guides contact bottom surfaces of the two first edges of the ink cartridge while the ink cartridge is loaded.

5. The printer according to claim 1,
wherein the first lid includes a pair of side surface portions that are plate-shaped and disposed so as to sandwich side surfaces of the ink cartridge while the ink cartridge is loaded,
the second pivot axis is parallel to the first pivot axis,
the lift includes a contact portion that is elongated and extends radially from the second pivot axis, and
the contact portion is contactable with at least one side surface portion among the pair of side surface portions from below.

6. The printer according to claim 5,
wherein the first lid includes a top portion that is plate-shaped and covers an area above a top surface of the ink cartridge,
the lift further includes a second fitting that is plate-shaped and extends from the second pivot axis in a direction perpendicular to the contact portion, and
the second fitting fits together with a first fitting included in the top portion to function as the restrictor.

7. The printer according to claim 4,
wherein the first lid includes a retainer that is plate-shaped and contacts the top surface of the ink cartridge while the ink cartridge is loaded.

8. The printer according to claim 7,
wherein the first lid includes a first biasing component that, while the ink cartridge is loaded, biases the retainer toward a base that supports the ink cartridge from below to pin the ink cartridge down onto the base.

9. The printer according to claim 1,
wherein the lift includes a second biasing component that, while the ink cartridge is loaded, biases the ink cartridge toward the first end portion.

10. The printer according to claim 1, further comprising a base that supports the ink cartridge from below and engages with a shaft that guides translation of the carriage,
wherein the first pivot axis is parallel to the shaft.

11. The printer according to claim 1,
wherein the carriage is capable of holding a plurality of the ink cartridges, and
the first lid holds and aligns the plurality of the ink cartridges parallel to the first pivot axis.

12. The printer according to claim 11,
wherein each of the plurality of the ink cartridges is a container having a top surface with a rectangular shape,
the top surface has, on opposing sides, two first edges that protrude beyond a side surface portion of the container,
the two first edges run perpendicular to the first pivot axis while the ink cartridge is mounted in the carriage,
the first lid includes a plurality of side surface portions that sandwich the two first edges of each of the plurality of the ink cartridges, while the plurality of the ink cartridges are loaded, the plurality of side surface portions include a first side surface portion disposed between two ink cartridges among the plurality of the ink cartridges and shared by the two ink cartridges, the first side surface portion including, on both sides, guides that are elongated and protrude into spaces where the plurality of the ink cartridges are mounted, the plurality of side surface portions include two second side surface portions that are different than the first side surface portion, the two second side surface portions including, on sides facing the plurality of the ink cartridges, the guides that are elongated and protrude into the spaces where the plurality of the ink cartridges are mounted, and top surfaces of the guides contact bottom surfaces of the two first edges of each of the plurality of the ink cartridges while the plurality of the ink cartridges are loaded.

13. The printer according to claim 12,
wherein the lift lifts the second end portion of the first lid by rotating the first lid about the first pivot axis,
the second pivot axis is parallel to the first pivot axis,
the lift includes a contact portion that is elongated and extends radially from the second pivot axis, and
the contact portion is contactable with at least one side surface portion among the plurality of side surface portions from below.

14. The printer according to claim 13,
wherein the first lid includes a top portion that is plate-shaped, provided in common for the plurality of the ink cartridges, and covers an area above the top surfaces of the plurality of the ink cartridges,
the lift further includes a second fitting that is plate-shaped and extends from the second pivot axis in a direction perpendicular to the contact portion, and
the second fitting fits together with a first fitting included in the top portion to function as the restrictor.

* * * * *